United States Patent [19]

Chakirof

[11] 4,115,300

[45] Sep. 19, 1978

[54] STABILIZED POLYOL COMPOSITIONS AND POLYURETHANE FOAMS

[75] Inventor: Dimitri A. Chakirof, San Pedro, Calif.

[73] Assignee: The Upjohn Company, Kalamazoo, Mich.

[21] Appl. No.: 800,216

[22] Filed: May 25, 1977

[51] Int. Cl.² .......................... C08G 41/00; C09K 3/28
[52] U.S. Cl. .................... 521/171; 252/182; 521/114; 521/129
[58] Field of Search ................. 260/2.5 AC, 2.5 BB; 252/182

[56] References Cited

U.S. PATENT DOCUMENTS

| 2,924,532 | 2/1960 | Dereich | 260/45.75 B |
| 3,378,497 | 4/1968 | Lanham | 252/182 |
| 3,448,046 | 6/1969 | Schalin | 260/2.5 AP |
| 3,745,133 | 7/1973 | Comunale et al. | 260/2.5 AW |
| 3,980,579 | 9/1976 | Syrop et al. | 260/2.5 AC |

Primary Examiner—V. P. Hoke
Attorney, Agent, or Firm—James S. Rose; Denis A. Firth

[57] ABSTRACT

Novel stabilized polyhalogenated polyol blends are disclosed which include in the blend a catalytic amount of a tertiary amine urethane catalyst and a stabilizing amount of a particular diepoxide. The polyol blends retain the same catalytic reactivity for reaction with organic polyisocyanates to form polyurethane foams over extended storage periods and are also stable with respect to blend viscosity. The polyurethane foams prepared from the stabilized polyol blends are characterized by excellent flame resistance and low smoke evolution when tested according to the ASTM E-84 test. The stabilized polyol blends provide an efficient means for reducing the number of polyurethane forming components or streams that need be stored, handled, or pumped to a polyurethane foam mixing apparatus.

10 Claims, No Drawings

STABILIZED POLYOL COMPOSITIONS AND POLYURETHANE FOAMS

BACKGROUND OF THE INVENTION

1. Field of the Invention

This invention relates to polyol compositions and is more particularly concerned with novel stabilized halogenated polyol blends and their utilization in the preparation of fire retardant polyurethane foams.

2. Description of the Prior Art

It is well known in the polyurethane foam art to employ polyol blends which contain additional ingredients to the polyol itself, for example, flame retardants, catalysts, blowing agents, etc., and thereby reduce the number of components or streams that need be stored, handled, or pumped into a reaction zone; for example see U.S. Pat. No. 3,378,497.

Problems of polyol blend stability arise when the blend contains components which tend to degrade on standing, particularly, by way of the formation of minor amounts of an acidic product. Generally speaking, when the polyol blend also contains a polyurethane catalyst and acidic by-products are slowly generated in the blend, the catalyst is at least partially neutralized by the acid products and the polyol blend therefore has reduced reactivity when it is eventually reacted with an isocyanate component to form a polyurethane.

The prior art discloses means for avoiding this problem in certain cases; see for example U.S. Pat. No. 3,378,497 wherein polyol blends, which contain fire retardant organic phosphorus compounds along with organotin urethane catalysts and optionally a tertiary amine catalyst, are stabilized by the addition of a vicinal epoxide to stabilize the mixture against loss of reactivity.

U.S. Pat. No. 3,448,046 discloses polyol blends which contain chlorinated fire retardants and a minor amount of an epoxide as stabilizer.

U.S. Pat. No. 3,980,579 demonstrates that a blend of a halogenated polyol with a tertiary alkyl amine catalyst can be stabilized by including a sulfur containing organotin compound.

It has now been discovered that aliphatic polyols, rich in halogen content, when combined with a tertiary amine urethane catalyst and a minor amount of an epoxide compound selected from a particular class of epoxides, form stabilized polyol blends. The blends are stable both in respect of catalyzed polyol reactivity and blend viscosity. Amines are known curatives for epoxides but surprisingly in the polyol blends of the present invention, the amines are neither lost by reaction with the epoxide nor by neutralization by the acidic degradation products arising from the halogenated polyol. Unexpectedly, the acidic products appear to be neutralized exclusively by the epoxide.

In contrast to the prior art which stabilizes halogenated polyol blends through the use of expensive sulfur containing organotin compounds (see U.S. Pat. No. 3,980,579), the blends of the present invention achieve their stability through the use of readily available and inexpensive epoxides which, additionally, are fully reacted into the final polyurethane system. Contrastingly, the organotin mercaptides of the prior art remain as unreacted additives in the polyurethane foam.

SUMMARY OF THE INVENTION

This invention comprises a stabilized polyol blend comprising, (i) a halogenated polyol;
(ii) a tertiary amine urethane catalyst; and
(iii) a stabilizing amount of a diepoxide selected from the group consisting of

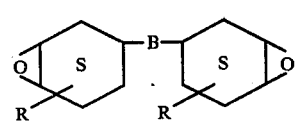
(a)

wherein R in each ring is independently selected from the group consisting of hydrogen and alkyl from 1 to 8 carbon atoms and B represents a divalent radical selected from the group consisting of

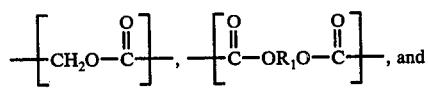

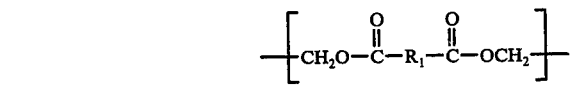
, and wherein $R_1$ is alkylene from 1 to 8 carbon atoms;

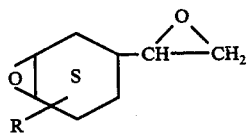
(b)

wherein R is defined as above; and

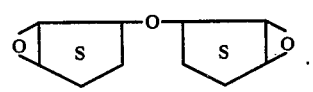
(c)

The invention also comprises the polyurethane foams prepared from the stabilized polyol blends defined above.

The term "halogenated polyol" means a halogenated aliphatic or cycloaliphatic polyester or polyether polyol or mixtures thereof having 2 to 8 hydroxyl groups wherein the polyol contains at least one halogen atom attached to an aliphatic or cycloaliphatic carbon in the polyol.

The term "halogen" means chlorine and bromine, or mixtures thereof.

The term "tertiary amine urethane catalyst" means any aliphatic tertiary amine, cycloaliphatic tertiary amine, or tertiary aminoalkanol, or mixtures thereof capable of promoting the reaction of an organic polyisocyanate with a polyol to form a polyurethane.

The term "alkyl from 1 to 8 carbon atoms" means methyl, ethyl, propyl, butyl, pentyl, hexyl, heptyl, octyl, and isomeric forms thereof.

The term "alkylene from 1 to 8 carbom atoms" means methylene, ethylene, propylene, butylene, pentylene, hexylene, heptylene, octylene, and isomeric forms thereof.

DETAILED DESCRIPTION OF THE INVENTION

The stabilized polyol blends in accordance with the present invention are prepared simply by blending together the components (i), (ii), and (iii) set forth above using any appropriate or convenient means for mixing ingredients known to those skilled in the art. The components can be mixed in any sequence of addition desired. Alternatively, they can be all mixed together in a single blending operation.

While not essential to the success of the present invention, in a preferred embodiment the components are blended together in a closed container in the absence of atmospheric moisture and air preferably under a nitrogen atmosphere.

Thus there are obtained the polyol blends in accordance with the invention which can be employed in the preparation of polyurethane foams directly upon completion of the blending operation, or, in their most useful embodiment, stored for prolonged periods of at least 6 months at ambient temperatures (for example 20° C) or transported over long distances prior to use with no loss in the catalytic activity of the amine component (ii) when the blend is finally reacted with a polyisocyanate to form the polyurethane.

The halogenated polyols (i) which can be employed in the present polyol blends are defined hereinbefore and include for example, the typical chlorinated cycloaliphatic polyester polyols such as those derived from chlorendic acid and various $\alpha,\omega$-aliphatic dicarboxylic acids as typically disclosed in U.S. Pat. Nos. 2,865,869, 3,058,925, 3,098,047; and 3,214,392 and whose disclosures with respect to these polyols are hereby incorporated by reference.

Preferred polyols employed in the polyol blends of the present invention are the chlorinated or brominated aliphatic polyether polyols disclosed in U.S. Pat. No. 3,980,579 whose disclosure is hereby incorporated by reference. Particularly preferred polyols are the chlorinated aliphatic polyether polyols having 2 to 8 hydroxy groups and characterized by hydroxyl number values from about 200 to about 700 and having a chlorine content of from about 25 percent to about 60 percent by weight. These preferred polyols are prepared by the condensation of a halogenated alkylene oxide or mixture of halogenated and halogen free alkylene oxide with a polyhydroxy compound. Typical of the halogenated alkylene oxides are 3,3-dichloro-1,2-epoxypropane; 3,3-dibromo-1,2-epoxypropane; 3,3,3-trichloro-1,2-epoxypropane; 4,4,4-trichloro-1,2-epoxybutane; 4,4,4-tribromo-1,2-epoxybutane; 4,4,4,3,3-pentachloro-1,2-epoxybutane; 1,1,1,4,4-pentachloro-2,3-epoxybutane; and mixtures thereof. The most preferred such halogenated alkylene oxides are those having three halogens in the molecule, the halogen being chlorine, such as 4,4,4-trichloro-1,2-epoxybutane.

The preferred polyhydroxy compounds include the carbohydrate-based materials particularly the dextrose and sucrose based materials. Particularly preferred polyhydroxy compounds are the mixtures of dextrose based polyols with aliphatic diols or triols such as ethylene glycol, propylene glycol, glycerol, and the like. These preferred polyols are particularly exemplified by the chlorinated polyether polyol set forth in Example 1 of U.S. Pat. No. 3,980,579 which is prepared from the reaction of 4,4,4-trichloro-1,2-epoxybutane with an equimolar mixture of ethylene glycol and $\alpha$-d-glucose monohydrate to a hydroxyl number of 360 and which has a chemically bound chlorine content of about 47 percent by weight.

The stabilized polyol blends in accordance with the present invention include mixtures of halogenated polyols with non-halogenated polyols in varying proportions. However, in a preferred embodiment wherein the polyol blend is employed in the preparation of polyurethane foams characterized by maximum resistance to burning and lowest evolution of smoke, the polyol mixture is comprised of at least 80 percent by weight of the preferred chlorinated aliphatic polyether polyol and the balance of said mixture comprising a non-halogenated polyol.

The non-halogenated polyol can be any of the polyols known to those skilled in the art as useful in the preparation of polyurethane foams; see for example those polyols disclosed in U.S. Pat. No. 3,745,133 columns 9 and 10, whose disclosure is hereby incorporated by reference.

Preferred such polyols are polyethers, for example, polyoxyalkylene glycols such as the polyoxyethylene glycols prepared by the addition of ethylene oxide to water, ethylene glycol or diethylene glycol, polyoxypropylene glycols prepared by the addition of 1,2-propylene oxide to water, propylene glycol or dipropylene glycol, mixed oxyethyleneoxypropylene polyglycols prepared in a similar manner utilizing a mixture of ethylene oxide and 1,2-propylene oxide; polyether glycols prepared by reacting ethylene oxide, propylene oxide or mixtures thereof with mono- and polynuclear polyhydric phenols, e.g., catechol, resorcinol, hydroquinone, orcinol, 2,2-bis(hydroxyphenyl) propane, bis(p-hydroxyphenyl)methane, and the like; polyethers prepared by reacting ethylene oxide, propylene oxide or mixtures thereof with aliphatic polyols such as glycerol, triethanolamine, trimethylolpropane, 1,2,6-hexanetriol, pentaerythritol, sorbitol, sucrose or the alkyl glycosides, e.g., the methyl, ethyl, propyl, butyl, and 2-ethylhexyl arabinosides, xylosides, fructosides, glucosides, rhamnosides, etc.; polyethers prepared by reacting ethylene oxide, propylene oxide or mixtures thereof with alicyclic polyols such as tetramethylolcyclohexanol; polyols containing a heterocyclic nucleus such as 3,3,5-tris(hydroxymethyl)-5-methyl-4-hydroxytetrahydropyran, and 3,3,5,5-tetrakis(hydroxymethyl)-4-hydroxytetrahydropyran, or polyols containing an aromatic nucleus such as 2,2-bis(hydroxyphenyl)ethanol, pyrogallol, phloroglucinol, tris(hydroxyphenyl)alkanes, e.g., 1,1,2-tris(hydroxyphenyl) ethanes, and 1,1,3-tris(hydroxyphenyl)propanes, etc., tetrakis(hydroxyphenyl)alkanes, e.g., 1,1,3,3-tetrakis (hydroxy-3-methylphenyl)propanes, 1,1,4,4-tetrakis(hydroxyphenyl)butanes, and the like.

The tertiary amine urethane catalyst component (ii) can be any of the tertiary amine catalysts as defined above and known to those skilled in the art. Typical of the amines that can be used are those set forth in U.S. Pat. No. 3,745,133 column 8, whose disclosure is hereby incorporated by reference. A preferred group of said tertiary amines are the trialkylamines such as trimethylamine, triethylamine, tributylamine and the like; 1,4-diazabicyclo [2:2:2] octane which is more frequently referred to as triethylene diamine and the lower alkyl derivatives such as 2-methyl triethylenediamine, 2,3-dimethyl triethylenediamine, 2,5-diethyltriethylenediamine and 2,6-diisopropyl triethylenediamine; the N,N-dialkylcyclohexylamines such as N,N-dimethylcyclohexylamine, N,N-diethylcyclohexylamine and the like; the N,N-dialkylalkanolamines such as N,N-dimethylethanolamine, N,N-diethylethanolamine and the like; the N-alkyldialkanolamines such as N-methyldiethanolamine and the like, ahd the trialkanolamines such as triethanolamine and the like.

A particularly preferred group of amines are the N,N-dialkylcyclohexylamines and a particularly preferred species from this group is dimethylcyclohexylamine.

The amount of tertiary amine (ii) which is employed in the blend can vary over a reasonably wide range depending upon the particular type of polyurethane foam which will ultimately be prepared from the blend and the rate of rise profiles desired. The actual amount needed to catalyze a particular reaction is easily determined by trial and error tests. Advantageously, the tertiary amine component will be employed within a range from about 0.0008 equivalent to about 0.02 equivalent per 100 parts of the halogenated polyol, preferably from about 0.0008 to about 0.016 equivalent, and most preferably from about 0.0016 equivalent to about 0.004 equivalent. By "equivalent" of tertiary amine is meant the chemical amine equivalent, i.e., the molecular weight of the amine divided by the number of tertiary amine groups in the molecule.

The diepoxide component (iii) can be any of those defined above under (iiia) to (iiic) and typical representatives of these classes are 3,4-epoxycyclohexylmethyl-3,4-epoxycyclohexanecarboxylate, 3,4-epoxy-6-methylcyclohexylmethyl-3,4-epoxy-6-methylcyclohexane carboxylate, and the like; ethylene glycol bis(3,4-epoxycyclohexanecarboxylate), 2-ethyl-1,3-hexanediol bis(3,4-epoxycyclohexanecarboxylate), and the like; bis(3,4-epoxy-6-methylcyclohexylmethyl)adipate, bis(3,4-epoxycyclohexylmethyl)adipate, bis(3,4-epoxy-6-methylcyclohexylmethyl)sebacate, and the like; vinyl cyclohexene dioxide, vinyl 6-methylcyclohexene dioxide, and the like; bis(2,3-epoxycyclopentyl)ether, and the like.

A preferred group of diepoxides is that defined as (iiia) and a preferred member of this group is 3,4-epoxycyclohexylmethyl-3,4-epoxycyclohexanecarboxylate.

The stabilizing amount of diepoxide which is employed in the blend must be sufficient to result in the stabilization of the amine component yet not large enough to cause a substantial viscosity increase in the polyol blend upon standing for a prolonged period. The actual amount needed to achieve the stabilization is easily determined by trial and error tests and will vary according to the equivalent weight of the diepoxide employed. The diepoxide is advantageously employed in a range of from about 0.007 equivalent to about 0.033 equivalent of epoxide per 100 parts of the halogenated polyol, preferably from about 0.007 equivalent to about 0.022 equivalent, and most preferably from about 0.011 equivalent to about 0.018 equivalent. By "equivalent" of epoxide is meant the chemical epoxide equivalent, i.e., the molecular weight of the epoxide divided by the number of epoxide groups in the molecule, namely, two.

Thus the stabilized polyol blends described above in accordance with the present invention find particular utility as storage stable components for the preparation of polyurethane foams and particularly polyurethane foams characterized by excellent resistance to burning and low smoke evolution when combusted. Although primarily useful in the preparation of polyurethane foams, the stabilized polyol blends can also be used in the preparation of polyisocyanurate foams wherein a minor amount of a polyol component is included as an ingredient; see for example U.S. Pat. No. 3,745,133.

As one of the major objectives of the present invention is to limit the required number of components which must be stored, handled, or pumped to a polyurethane foam mixing head, the stabilized polyol blends in accordance with this invention are not limited solely to the components (i) to (iii).

Accordingly, and, in a preferred embodiment of the present invention, the blend contains in addition to the ingredients set forth above, a volatile solvent as a blowing agent. Preferred as a class of volatile solvent blowing agents are the lower molecular weight halogenated aliphatic hydrocarbons having boiling points of from about −40° to about 200° C, preferably from about −20° to about 110° C. Most preferred are the fluorochlorocarbons and a preferred species is monofluorotrichloromethane.

Generally speaking, the amount of foaming agent employed depends upon the desired polyurethane foam density. However, it has been found that from 10 parts to about 50 parts of blowing agent per 100 parts of the halogenated polyol are advantageously employed in the practice of the present invention, and preferably from about 20 parts to about 40 parts.

Other optional ingredients such as dispersing agents, cell stabilizers, surfactants, additional flame retardants, antioxidants, and additional catalysts can be employed in the stabilized polyol blends described hereinabove.

As noted previously, these blends are surprisingly stable over prolonged periods of standing at ambient (20° C) temperature conditions for at least 6 months. This surprising stability refers to the polyol reactivity when reacted with a polyisocyanate in terms of the rise profile of the formed polyurethane foam. The rise profile times do not vary significantly from the initial values determined at time zero to those values determined at the end of a 6 month storage period. This constant rise profile attests to the stability of the amine catalyst component over this period in spite of the high halogen content of the polyols which on standing are known to eliminate minor amounts of acidic impurities such as hydrohalic acids which one would expect to react instantly with the organic tertiary amines to form the inactivated aminehydrohalide salts.

Furthermore, the viscosities of the blends are unexpectedly stable over the storage periods, increasing only to a minor extent. This increase can generally be attributed to the loss of small amounts of volatiles when handling the same sample over the storage period, particularly the loss of a fluorochlorocarbon component.

When the polyol blends of the present invention are used in the preparation of polyurethane foams they need only be reacted with an organic polyisocyanate component to produce the foams because, generally speaking, all the necessary ingredients are already present in the polyol blend. However, additional ingredients can be added if desired.

The polyurethane foams are prepared by methods well known to those skilled in the art such as the one-shot or prepolymer techniques; see for example Saunders & Frisch, Polyurethanes: Chemistry and Technology, Part II, 1964, Interscience Publishers, Div. of John Wiley and Sons, New York, N.Y.

Any of the organic polyisocyanates known to be useful by those skilled in the art can be used for reaction with the polyol blends of the present invention. Exemplary are the toluene diisocyanates (including isomer mixtures of the 2,4 and 2,6 species and mixtures thereof) and the polymethylene polyphenylisocyanates. Preferred polyisocyanates are the polymethylene polyphenylisocyanates. A most preferred polyisocyanate is a mixture containing from about 30 percent to about 85 percent by weight of methylenebis(phenylisocyanate) and the remainder of said mixture comprises polymethylene polyphenylisocyanates of functionality higher than 2.0.

The NCO to OH ratio is not critical but can vary from about 0.9 to about 1.3.

The polyol blends of the present invention find particular utility in the preparation of polyurethane foams which are characterized by flame spread rating (FSR) values of 25 or less and smoke ratings of as low as 120 when tested according to the ASTM E-84 Steiner Tunnel Burn Test. Such low FSR and smoke values are highly advantageous for the production of fire resistant polyurethane foam insulation.

The polyurethane foams prepared from the polyol blends of the invention are useful in the manufacture of fire resistant thermal insulation panels for refrigerator trucks, building insulation including walls and ceilings, and are particularly useful when the polyurethane foams are foamed in confined spaces such as long thin enclosed panels and the like.

The following examples describe the manner and process of making and using the invention and set forth the best mode contemplated by the inventors of carrying out the invention but are not to be construed as limiting.

EXAMPLE 1

The following two stabilized polyol blends (1 and 2) in accordance with the present invention were prepared by blending together the ingredients in the parts by weight set forth in Table I below.

The viscosities of the freshly prepared blends were immediately determined at 72° F while samples of each blend were reacted with a polyisocyanate in hand-mix polyurethane foam preparations and their reactivity determined by observing the foam rise profile times.

The foams were prepared by mixing 55.5 g. of each of the polyol blends set forth in Table I with 44.5 g. of a blend comprised of 100 parts of a polymethylene polyphenylisocyanate mixture containing about 45 percent by weight of methylenebis(phenylisocyanate) and the remainder of the mixture containing polymethylene polyphenylisocyanates of functionality higher than 2.0, and 10 parts of a fire retardant plasticizer containing 3.6 percent phosphorus and 24.5 percent chlorine and supplied by Stauffer Chemical Corp. under the tradename of Fyroflex 2800. The resultant mixes had an isocyanate to hydroxyl ratio of about 1.07. The 55.5 g. of polyol blend and 44.5 g. of isocyanate component were vigorously mixed together for about 12 to 15 seconds using a drill press motor driven stirrer blade and the mixture allowed to rise freely as the foam rise profiles were observed.

After the initial determinations the viscosity and reactivity of the polyol blends were measured thereafter at approximately 1 month intervals using freshly prepared isocyanate component so that aging would be a factor only with the polyol blend and not the isocyanate. The measurements of viscosity and foam rise for blends 1 and 2 with time are set forth in Table 1.

TABLE 1

| Polyol Blend | #1 | #2 |
|---|---|---|
| RF-230[1] | 100 | 100 |
| X-431[2] | 20 | 20 |
| DC-193[3] | 2 | 2 |
| N,N-dimethylcyclohexylamine | 0.5 (0.004 eq.) | 0.25 (0.002 eq.) |
| Potassium acetate (40% soln. in ethylene glycol) | — | 1.0 |
| 3,4-epoxycyclohexylmethyl-3,4-epoxycyclohexanecarboxylate | 2.5 (0.018 eq.) | 2.0 (0.015 eq.) |
| Freon-11[4] | 40 | 40 |
| Allo-ocimene[5] | 0.3 | 0.3 |
| Viscosity of blend in centipoises (at ° F): | | |
| Initial | 380(72) | 386(72) |
| 1 month | 335(73) | 350(73) |
| 2 months | 345(72) | 360(72) |
| 3 months | 420(72) | 450(72) |
| 5 months* | 480(73) | 470(73) |
| 6 months** | 560(72) | 546(72) |
| Foam rise profile (minutes:seconds) listed as: Cream Tack free Rise Gel | | |
| Initial: | 0.30 | 0.34 |
|  | 3.10 | 3.20 |
|  | 3:20 | 3:20 |
|  | 2:15 | 2:10 |
| 1 month | 0:26 | 0:30 |
|  | 3:10 | 3:25 |
|  | 3:20 | 3:25 |
|  | 2:20 | 2:15 |
| 2 months | 0:40 | 0:40 |
|  | 3:30 | 3:30 |
|  | 3:40 | 3:40 |
|  | 2:35 | 2:35 |
| 3 months | 0:28 | 0:30 |
|  | 3:00 | 3:00 |
|  | 3:25 | 3:20 |
|  | 2:20 | 2:15 |
| 5 months* | 0:30 | 0:30 |
|  | 3:00 | 3:20 |
|  | 3:20 | 3:20 |
|  | 2:20 | 2:20 |
| 6 months** | 0:30 | 0:30 |
|  | 3:00 | 3:15 |
|  | 3:20 | 3:15 |
|  | 2:25 | 2:22 |

*5 months and 3 weeks;
**about 6 months and 1 week.
[1]RF-230: a chlorinated aliphatic polyether polyol containing about 47% by weight of chemically bound chlorine; # = 365; acid # = 0.8; pH (in 10/6 isopropanol/water) = 4.5 – 7.0; supplied by Olin Corp., Stamford, Conn. 06904.
[2]X-431: an aliphatic triol; OH # = 600; M.W. = 280; supplied by Olin Corp., Stamford, Conn., 06904.
[3]DC-193: a silicone surfactant supplied by Dow Corning Corp., see "Dow Corning 193 Surfactant", Bulletin 05-146, February, 1966.
[4]Freon 11: monofluorotrichloromethane blowing agent.
[5]Allo-ocimene: 2,6-dimethyloctatriend-2,4,6 employed as an antioxidant.

The polyol blends possess virtually identical rise profiles over a 6 month storage period in spite of the combination of amine and epoxide together in the same blend with a highly halogenated aliphatic material. The increases in blend viscosities over the studied period are relatively minor and considered to be due to loss of freon over the period.

When a polyol blend identical to those described above, except that it contained 1 g. (0.008 eq.) of N,N-dimethylcyclohexylamine and 5.0 grams (0.037 eq.) of the epoxide which was above the upper limit for the amount of this epoxide which could be tolerated in the blend, was evaluated for shelf stability, its reactivity stayed constant over a 2 month and 20 day test period, however, the viscosity of the blend increased from an initial value of 380 cps. at 73° F to 780 cps. at 74° F which was in excess of a 100% increase during the period. The rate of viscosity build-up was excessive and beyond the limit which could be tolerated for a polyol blend of this type.

EXAMPLE 2

The following rigid polyurethane foam was prepared using the procedure of Example 1 and a stabilized polyol blend (Component B) in accordance with the invention and the same isocyanate blend (Component A) as described in Example 1. The ingredients (in parts by weight) are set forth in Table II. The foam was prepared using 44.9 g. of Component A to 55.1 g. of Component B to provide an NCO to OH index of 1.07.

The foam is characterized by excellent physical properties and particularly noteworthy is the very low FSR and smoke values observed.

TABLE II

| Ingredients: | |
|---|---|
| Component A: | |
| Polymethylene polyphenylisocyanate | 100 |
| Fyroflex 2800 | 10 |
| Component B: | |
| RF-230 | 100 |
| X-431 | 20 |
| DC-193 | 2.0 |
| N,N-dimethylcyclohexylamine | 0.25(0.002 eq.) |
| Potassium acetate (40% soln. in ethylene glycol) | 1.0 |
| 3,4-epoxycyclohexylmethyl-3,4-epoxycyclohexanecarboxylate | 2.0 (0.015 eq.) |
| Freon-11 | 33 |
| Allo-ocimene | 0.3 |
| Rise profile (minutes:seconds): | |
| Cream | 0:28 |
| Tack free | 2:35 |
| Rise | 3:00 |
| Gel | 2:00 |
| Physical Properties: | |
| Density, p.c.f. | 1.92 |
| Compressive str. (psi): | |
| ∥ to rise | 14.9 |
| ⊥ to rise | 13.7 |
| Tensile str. (psi): | |
| ∥ to rise | 21.0 |
| ⊥ to rise | 26.4 |
| Shear str.(psi) | 16.3 |
| Flexural str.(psi) | 23.0 |
| ASTM C-518 Test for Thermal Conductivity BTU in./hr. ft.$^2$ ° F | 0.133 |
| ASTM E-84 Tunnel Test on 4 inch thick sample: | |
| Flame spread | 20 |
| Fuel contribution | 5 |
| Smoke density | 135 |

EXAMPLE 3

The following two polyol blends 3 and 4 employing two polyglycol diepoxides not in accordance with the present invention were prepared by blending together the ingredients in the proportions by weight set forth in Table III below. The polyol blend stabilities were evaluated using the same procedures described in Example 1 for measuring foam rise profile times and blend viscosities and employing the same polyisocyanate blend. The proportions of isocyanate blend to polyol blend in parts by weight were 44/56 and 40/60 for polyol blends 3 and 4 respectively.

TABLE III

| Polyol Blend | #3 | #4 |
|---|---|---|
| RF-230 | 100 | 100 |
| X-431 | 20 | 20 |
| DC-193 | 2 | 2 |
| DER 732[1] | 6 (0.019 eq.) | — |
| DER 736[2] | — | 12 (0.06 eq.) |
| N,N-dimethylcyclohexylamine | 0.8 (0.006 eq.) | 0.8 (0.006 eq.) |
| Freon-11 | 40 | 40 |
| Allo-ocimene | 0.3 | 0.3 |
| Viscosity of blend in centipoises (at 70° F): | | |
| Initial | 400 | 350 |
| 1 month | 800 | 1475 |
| Foam rise profile (minutes:seconds) listed as: | | |
| Cream | | |
| Tack free | | |
| Rise | | |
| Gel | | |
| Initial: | 0:30 | 0:23 |
| | 2:10 | 1:45 |
| | 2:30 | 2:00 |
| | 1:50 | 1:15 |
| 1 month: | 0:32 | 0:38 |
| | 3:45 | 3:45 |
| | 4:00 | 4:15 |
| | 3:10 | 3:00 |

[1]DER 732: An aliphatic polyglycol diepoxide supplied by The Dow Chemical Co., Midland, Mich.; epoxide equiv. wt. = 305 – 335.
[2]DER 736 An aliphatic polyglycol diepoxide supplied by The Dow Chemical Co., Midland, Mich.; epoxide equiv. wt. = 175 – 205.

In polyol blend #3 the amount of diepoxide was within the range called for by the invention, but the diepoxide was an aliphatic polyglycol diepoxide and therefore not in accordance with the invention. In blend #4 neither the amount nor the type of the epoxide are in accordance with the invention. The stability studies were carried no further than about 1 month after the initial determination because the increase observed in blend viscosities and foam rise times showed clearly a lack of polyol blend stability.

EXAMPLE 4

The following two polyol blends 5 and 6, employing no epoxide stabilizers and therefore not in accordance with the present invention, were prepared by blending together the ingredients in the proportions by weight set forth in Table IV below. The polyol blend stabilities were evaluated using the same procedures described in Example 1 for measuring foam rise profile times and blend viscosities and employing the same polyisocyanate blend. The proportions of isocyanate blend to polyol blend in parts by weight were 44.8/55.2 for blend 5 while blend 6 was 44.6/55.4 throughout.

TABLE IV

| Polyol Blend | #5 | #6 |
|---|---|---|
| RF-230 | 100 | 100 |
| X-431 | 20 | 20 |
| DC-193 | 2 | 2 |
| N,N-dimethylcyclohexylamine | 0.5(0.004 eq.) | 1.0(0.008 eq.) |
| Potassium acetate 40% soln. in ethylene glycol) | 1.5 | — |
| Sodium hydroxide (30% in diethylene glycol) | — | 2.0 |
| Freon-11 | 40 | 40 |
| Allo-ocimene | 0.3 | 0.3 |
| Viscosity of blend in centipoises (at ° F): | | |
| Initial* | 350(72) | 350(72) |
| 1 month | 474(73) | 380(73) |
| 2 months | 590(73) | 460(73) |
| Foam rise profile** (minutes:seconds) listed as: | | |
| Cream | | |
| Tack free | | |
| Rise | | |
| Gel | | |
| Initial: | 0:28 | 0:20 |
| | 2:10 | 1:35 |
| | 2:35 | 2:00 |
| | 1:40 | 1:20 |
| 1 month: | 0:27 | 0:23 |
| | 2:20 | 1:50 |
| | 2:45 | 2:30 |

TABLE IV-continued

| Polyol Blend | #5 | #6 |
|---|---|---|
|  | 1:50 | 1:45 |
| 2 months: | 0:32 | 0:27 |
|  | 2:45 | 2:30 |
|  | 3:20 | 2::50 |
|  | 2:10 | 2:05 |

*Viscosity measurements had been made 18 days prior to these initial determinations and were virtually identical to the initial values above.
**Foam rise profile measurements had been made 18 days prior to these initial determinations with blend #5 at an isocyanate to polyol blend parts ratio of 43.5/56.5 and blend #6 at the identical ratio set forth above for blend #6.

The stability studies at the end of 2 months showed about a 30 percent and 42 percent increase in rate of rise for blends 5 and 6 respectively along with increases in the other rise profile points which clearly showed the rapid deactivation of the catalyst component of each blend. This observation was even more noteworthy for blend #6 where the concentration of amine catalyst was higher than blend #5 and blend #6 additionally contained the very strong sodium hydroxide catalyst component which is known to give rise to very rapid urethane rise profiles.

I claim:
1. A stabilized polyol blend comprising,
   (i) a halogenated polyol;
   (ii) a tertiary amine urethane catalyst; and
   (iii) a stabilizing amount of a diepoxide selected from the group consisting of

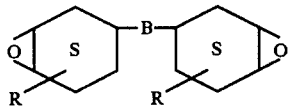 (a)

wherein R in each ring is independently selected from the group consisting of hydrogen and alkyl from 1 to 8 carbon atoms and B represents a divalent radical selected from the group consisting of

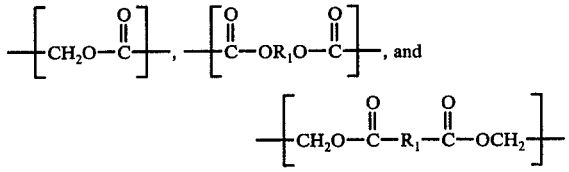

wherein $R_1$ is alkylene from 1 to 8 carbon atoms;

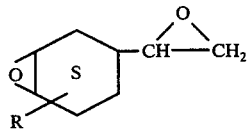 (b)

wherein R is defined as above; and

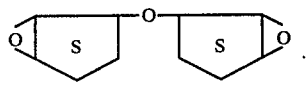 (c)

2. A stabilized polyol blend comprising,
   (i) a halogenated aliphatic polyether polyol;
   (ii) a tertiary amine urethane catalyst; and
   (iii) a stabilizing amount of a diepoxide having the formula

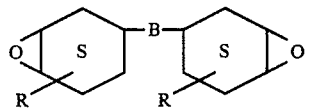

wherein R in each ring is independently selected from the group consisting of hydrogen and alkyl from 1 to 8 carbon atoms and B represents a divalent radical selected from the group consisting of

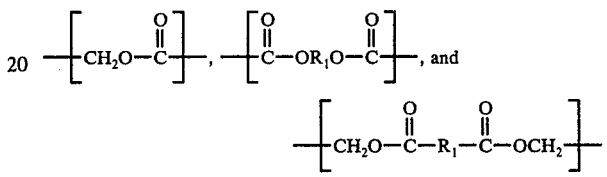

wherein $R_1$ is alkylene from 1 to 8 carbon atoms.

3. A stabilized polyol blend according to claim 2 wherein said tertiary amine is an N,N-dialkylcyclohexylamine.

4. A stabilized polyol blend according to claim 2 wherein said epoxide is 3,4-epoxycyclohexylmethyl-3,4-epoxycyclohexanecarboxylate.

5. A stabilized polyol blend according to claim 2 wherein said polyol is a chlorinated aliphatic polyether polyol.

6. A stabilized polyol blend according to claim 2 wherein a fluorochlorocarbon blowing agent is additionally present.

7. A stabilized polyol blend comprising,
   (i) a polyol mixture comprising at least 80 percent by weight of a chlorinated aliphatic polyether polyol containing about 47 percent by weight of chemically bound chlorine and the balance of said mixture comprising a non-chlorinated polyol;
   (ii) N,N-dimethylcyclohexylamine;
   (iii) a stabilizing amount of 3,4-epoxycyclohexylmethyl-3,4-epoxycyclohexanecarboxylate; and
   (iv) monofluorotrichloromethane.

8. A stabilized polyol blend according to claim 7 wherein said polyol mixture comprises about 83 percent by weight of said chlorinated polyol and the balance of said mixture comprises a non-chlorinated polyol, about 0.0016 equivalent of N,N-dimethylcyclohexylamine and about 0.012 equivalent of 3,4-epoxycyclohexylmethyl-3,4-epoxycyclohexanecarboxylate per 100 parts of said polyol mixture and about 28 parts of monofluorotrichloromethane per 100 parts of said polyol mixture.

9. A polyurethane foam prepared by reacting a polyol blend as defined in claim 1 and an organic polyisocyanate under foam producing conditions.

10. A polyurethane foam according to claim 9 wherein said organic polyisocyanate is a polymethylene polyphenylisocyanate.

* * * * *